(12) United States Patent
Singleton

(10) Patent No.: US 8,277,646 B2
(45) Date of Patent: Oct. 2, 2012

(54) SYSTEM AND METHOD FOR TEMPORARY STORM WATER DRAINAGE CONTROL

(76) Inventor: Earl R. Singleton, Oxford, GA (US)

( * ) Notice: Subject to any disclaimer, the term of this patent is extended or adjusted under 35 U.S.C. 154(b) by 407 days.

(21) Appl. No.: 12/488,686

(22) Filed: Jun. 22, 2009

(65) Prior Publication Data

US 2010/0320131 A1    Dec. 23, 2010

(51) Int. Cl.
*E03F 5/06*    (2006.01)

(52) U.S. Cl. .................................. 210/163; 210/767

(58) Field of Classification Search ............ 210/163, 210/767
See application file for complete search history.

(56) References Cited

U.S. PATENT DOCUMENTS

| | | | |
|---|---|---|---|
| 248,559 A | 10/1881 | Jackson | |
| 770,019 A | 9/1904 | Neireiter | |
| 1,310,055 A | 7/1919 | Caldwell | |
| 1,711,674 A | 5/1929 | Egan | |
| 1,791,512 A | 2/1931 | Schurman | |
| 2,201,279 A | 5/1940 | Willing | |
| 2,375,345 A | 5/1945 | Burhans | |
| 2,873,896 A * | 2/1959 | Swartz | 222/548 |
| 2,889,932 A | 6/1959 | Mackintosh | |
| 3,303,973 A * | 2/1967 | Dootson | 222/190 |
| 3,517,813 A | 6/1970 | Thaler | |
| 3,572,413 A * | 3/1971 | Livingstone | 220/782 |
| 3,695,443 A | 10/1972 | Schmidt, Jr. | |
| 3,713,539 A | 1/1973 | Thompson et al. | |
| 3,739,913 A | 6/1973 | Bogosian | |
| 3,830,373 A | 8/1974 | Sixt et al. | |
| 3,889,851 A * | 6/1975 | Kain | 222/146.4 |
| 3,972,078 A | 8/1976 | Maki | |
| 4,034,428 A * | 7/1977 | Jacuzzi | 29/221.6 |
| 4,094,790 A | 6/1978 | Schmidt, Jr. | |
| 4,162,863 A | 7/1979 | Gaudard et al. | |
| 4,180,464 A | 12/1979 | Beane | |
| 4,268,390 A | 5/1981 | Cunningham | |
| 4,418,432 A | 12/1983 | Vidal | |
| 4,419,232 A | 12/1983 | Arntyr et al. | |
| 4,460,462 A | 7/1984 | Arneson | |
| 4,525,273 A | 6/1985 | Logsdon | |
| 4,594,157 A | 6/1986 | McGowan | |
| 4,658,449 A | 4/1987 | Martin | |
| 4,719,724 A | 1/1988 | Ditcher | |
| 4,786,214 A * | 11/1988 | Schmidt et al. | 405/303 |
| 4,925,342 A | 5/1990 | Hendy | |
| 4,957,389 A | 9/1990 | Neathery | |
| 5,062,735 A | 11/1991 | Gaudin | |
| 5,107,635 A | 4/1992 | Carpenter | |
| 5,284,580 A | 2/1994 | Shyh | |

(Continued)

FOREIGN PATENT DOCUMENTS

JP    10183593 A  *  7/1998

*Primary Examiner* — Chester Barry
(74) *Attorney, Agent, or Firm* — Womble Carlyle Sandridge & Rice, LLP

(57) ABSTRACT

A temporary storm water drainage control member having a first portion including a series of flow control openings formed therein, and a second portion defining a side wall, is releasably mountable over or within the open end of a storm water pipe system. The side wall of the second portion of the drainage control member engages the storm water pipe in a frictionally engaging fit to mount the drainage control member over or within the opening of the storm water pipe.

16 Claims, 3 Drawing Sheets

U.S. PATENT DOCUMENTS

| | | |
|---|---|---|
| 5,297,367 A | 3/1994 | Sainz |
| 5,297,895 A | 3/1994 | Johnson |
| 5,345,741 A | 9/1994 | Slater et al. |
| 5,372,714 A | 12/1994 | Logue, Jr. |
| 5,383,745 A * | 1/1995 | Shannon .................. 405/52 |
| 5,389,166 A | 2/1995 | White |
| 5,403,474 A | 4/1995 | Emery |
| 5,405,539 A | 4/1995 | Schneider |
| 5,407,570 A | 4/1995 | Hobson, Jr. |
| 5,407,575 A | 4/1995 | Vinsonhaler |
| 5,469,670 A | 11/1995 | Thaler |
| 5,486,287 A | 1/1996 | Murphy et al. |
| 5,526,613 A | 6/1996 | Simeone, Jr. |
| 5,575,925 A | 11/1996 | Logue, Jr. |
| 5,587,072 A | 12/1996 | Regan |
| 5,592,783 A | 1/1997 | Jones |
| 5,632,888 A | 5/1997 | Chinn et al. |
| 5,643,445 A | 7/1997 | Billias et al. |
| 5,650,065 A | 7/1997 | Sewell |
| 5,725,782 A | 3/1998 | Chinn et al. |
| 5,733,444 A | 3/1998 | Johnson |
| 5,744,048 A | 4/1998 | Stetler |
| 5,776,567 A | 7/1998 | Schilling et al. |
| 5,843,306 A | 12/1998 | Singleton |
| 5,948,250 A | 9/1999 | Midddleton |
| 5,954,952 A | 9/1999 | Strawser, Sr. |
| 5,966,876 A | 10/1999 | Neathery et al. |
| 5,980,740 A | 11/1999 | Harms et al. |
| 6,004,457 A | 12/1999 | Singleton |
| 6,015,489 A | 1/2000 | Allen et al. |
| 6,017,166 A | 1/2000 | Mossburg, Jr. |
| 6,041,944 A | 3/2000 | Meier |
| 6,261,445 B1 | 7/2001 | Singleton |
| 6,416,674 B1 | 7/2002 | Singleton et al. |
| 6,428,693 B2 | 8/2002 | Singleton |
| 6,464,428 B1 | 10/2002 | Mikell |
| 6,595,721 B2 * | 7/2003 | Kincheloe .................. 405/125 |
| 6,709,579 B1 | 3/2004 | Singleton |
| 6,808,623 B2 | 10/2004 | Harris et al. |
| 6,942,425 B2 * | 9/2005 | Kincheloe .................. 405/125 |
| 6,994,489 B1 | 2/2006 | Corr |
| 7,074,326 B2 | 7/2006 | Singleton |
| 7,108,783 B2 | 9/2006 | Glazik |
| 7,157,010 B1 | 1/2007 | Wolfe |
| D539,918 S | 4/2007 | Denmon |
| 7,246,968 B1 | 7/2007 | Priest |
| 7,465,129 B2 | 12/2008 | Singleton |
| 7,534,355 B2 * | 5/2009 | Lockerman et al. ....... 210/747.3 |
| RE42,695 E | 9/2011 | Singleton |
| 2002/0130070 A1* | 9/2002 | Roesner .................. 210/163 |
| 2004/0011731 A1* | 1/2004 | Sanguinetti .................. 210/483 |
| 2007/0069191 A1 | 3/2007 | Arnold et al. |
| 2007/0107114 A1* | 5/2007 | Zahner .................. 4/211 |
| 2010/0065491 A1* | 3/2010 | Bussey et al. .................. 210/484 |

* cited by examiner

SYSTEM AND METHOD FOR TEMPORARY STORM WATER DRAINAGE CONTROL

FIELD OF THE INVENTION

The present invention generally relates devices and systems for preventing silt and debris from collecting in storm water drainage pipes, and in particular to a drainage control member or system adapted to be temporarily mountable over an open end of an inlet for a storm sewer drainage system for restricting fluid flows into the inlet so as to trap and substantially prevent silt and other debris from being washed or otherwise deposited within the inlet, while still enabling water to drain into and through the inlet.

BACKGROUND OF THE INVENTION

During the construction of new housing, commercial developments and highways, the site work or roads for the development generally is marked out and graded to the engineer's specifications. The storm water drainage system is generally constructed in conjunction with the site work, which drainage system typically includes a series of interconnected underground drainage pipes, collection boxes and culverts, and drop inlets that will later form the manholes or drain openings for the storm water drainage system at the street level. The storm water drainage pipes generally are substantially cylindrically shaped concrete, metal or plastic pipes that connect to each other in series, as well as connecting to culverts and collection boxes at varying points along the storm water system. Once the storm water drainage system has been substantially installed, it typically is buried and the curbs for the street will provide curb inlets into which the storm water runoff will drain.

During the construction of roads and storm water drainage systems, and similarly during the repair and replacement or updating of such storm water drainage systems, until the street and storm water drainage or system have been substantially completed and the curbs and throats of the storm water drainage system have been poured, the drainage pipes must be kept free of dirt and debris, including sediment, sand and other material in order to comply with state and county building codes and state and federal environmental regulations. If dirt and debris are allowed to wash into and collect within the drainage pipes, such silt and debris can be washed into downstream lakes, rivers, etc., creating environmental hazards therein. Keeping dirt and debris out of the storm water drainage system is, however, very difficult to accomplish during the construction of the drainage system since the drainage system typically is constructed within trenches dug into the ground along the sides of the roads, which trenches cannot be covered or filled in until the drainage system is completed. At the same time, the roadways also generally are being cut and graded by motor graders or bulldozers such that dirt and debris from the roadway areas is piled up and pushed to the sides, often onto and around the drainage system pipes. Additionally, rain, runoff water and wind also tend to wash or blow dirt and debris into the open ends of the drainage pipes.

In accordance with many state and county building regulations/codes, any dirt and debris washed into or otherwise collected within the drainage pipes and/or other parts of the drainage system must be removed. This usually means that laborers will have to be sent down into the pipes of the storm water drainage system to manually clean the dirt and/or debris from the drainage system. Such cleaning operations are, however, difficult as the storm water pipes typically are somewhat cramped, making it difficult to maneuver within the pipes, and there is further a significant risk or danger of cave-ins or collapse of dirt, etc., that has built up around the sides of the storm water drainage system pipes, creating a significant risk of injury or even death to the laborers working below. Still further, open storm water pipes can be especially dangerous for children who might play in or around the area and are more likely to be curious and could enter and become trapped within the drainage pipes.

In the past, most storm water inlet pipes generally have been protected with sheets of silt fence material or plywood staked across the front of the storm water pipe. As shown in FIG. 1, such sheets of wood 1, such as plywood, or other solid materials often have been mounted in front of open storm water pipes 1 and secured with stakes, bricks or other bracing material 2 to try to block the ingress of dirt and debris into the open storm water pipes, while still enabling the boards to be removed as construction of the storm water drainage system continues. Such solutions, however, often can be ineffective at protecting and preventing dirt and debris from entering the storm water drainage system. For example, fabric silt fence materials often can be collapsed or torn as dirt is piled thereover, such as by bulldozers or other road grading equipment. Likewise, sheets of wood, such as plywood 1 placed in front of open storm water pipes, as shown in FIG. 1, can be blown over by strong gusts of wind, and/or can be shifted or moved during heavy rainstorms and as dirt is piled thereagainst, thus causing the open end of the sewer inlet to be exposed. Additionally, use of plywood sheets and other similar degradable materials around the open pipes can further create additional debris that can wash into the storm water pipes.

Alternatively, completely sealing or closing off the open end of the storm water pipe, which is often done using current construction methods, also blocks the rain and storm runoff water from properly draining into and through the storm water drainage pipe of the development during construction. It is, however, important that the storm water runoff be allowed to properly drain away so as to permit the ground around the development to properly dry to prevent construction delays and to prevent storm water from eroding the work site and carrying away soil and debris to adjacent lots or buildings. The construction site further needs to be kept as dry as possible in order to enable additional phases of the storm water drainage system to be constructed.

Accordingly, it can be seen that a need exists for a device and system that enables open ends of storm water drainage pipes to be covered and protected so as to substantially prevent silt, dirt and debris from being washed or blown into the piping system, while enabling substantially free and complete drainage of storm water runoff into the drainage system and further facilitating the continuation and completion of construction of the storm water drainage system without interference therewith.

SUMMARY OF THE INVENTION

Briefly described, the present invention generally is directed to a drainage control member adapted to be releasably mounted over or within an open end of a storm water pipe to assist in the control and prevention of dirt and debris from passing into and collecting within the storm water drainage pipe during construction and/or repair thereof as runoff water is drained into and through the storm water drainage system. As construction of the storm water drainage system continues, the drainage control member can be removed and reused as construction of the storm water drainage system is continued to completion. The present invention thus provides a temporary drainage control member for control of and filtering debris and preventing sediment storm water runoff from entering the storm water pipe, while still enabling the passage of runoff water therethrough.

The drainage control member generally includes a control member body having a first, upper or distal portion, and a second, lower or proximal portion. The drainage control member body generally is formed from a resilient material such as a plastic or synthetic material, although other durable, resilient materials also can be used. The drainage control member further generally will be formed in a configuration substantially matching the configuration of a storm water pipe on which it will be temporarily mountable. The first or distal portion of the drainage control member body can include a rim formed thereabout and a series of flow control openings formed therethrough. The number and size of the flow control openings can be varied depending upon the application and/or environment for use of the drainage control member.

The second or proximal portion of the drainage control member body can be formed, such as by molding, extruding, etc., as a unitary structure with the upper or distal portion, or can be formed as a separate piece attached to the upper or distal portion by fasteners, adhesives, or other methods. The proximal portion generally defines a side wall having a first end attached to the distal portion of the drainage control member, a second end spaced therefrom and generally defining a rim, and an intermediate portion between the first and second ends. The intermediate portion typically can have a substantially bowed or expanded configuration or diameter and further can include expansion features formed at spaced intervals thereabout, such as score lines, cuts or otherwise weakened areas, gussets, or other, similar features. The resiliency of the side wall generally will assist in maintaining engagement between the side wall of the drainage control member and a side wall of a sewer inlet on which it is used.

In use, the drainage control member can be temporarily mounted on a storm water drainage pipe over an open end or placed within the pipe opening. In one embodiment, the drainage control member can be fitted over the open end of the storm water drainage pipe, with the side wall of the proximal portion being inserted into the open end of the storm water drainage pipe such that the intermediate portion thereof engages an inner side wall of the sewer inlet in a tight, frictionally engaging fit. Additionally, the rim of the distal portion typically can substantially overlap and seal against the open end of the storm water drainage pipe so as to prevent dirt and debris from passing into the storm water drainage pipe from the sides of the drainage control member. Alternatively, depending upon the size of the storm water drainage pipe, the drainage control member of the present invention also can be mounted over the open end of a storm water drainage pipe with its proximal portion fitting over and engaging an outer side wall of the drainage pipe. In such a configuration, the rim of the distal portion typically can slide over and will be biased into a tight frictionally engaging fit against the outer side wall by the resiliency of the proximal portion and/or the bowed configuration of the intermediate portion thereof. As a result, the drainage control member is temporarily secured about the open end of the storm water drainage pipe without the need for additional fasteners, stakes, braces or other mounting means.

Once the drainage control member has been mounted over or within the open end of the storm water drainage pipe, a fitted filter cover made from mesh or other, similar filtering material can be placed over the front or top surface of the distal portion, at least partially covering the flow control openings formed therein. The fitted filter can be formed from one or more sheets, including overlapping sheets that can be fastened to the rim of the distal portion to secure the filtering material over the flow control openings. Alternatively, the filtering material can be formed as a fitted filter cover having a configuration substantially corresponding to the configuration of the distal portion of the drainage control member. The filtering material helps filter out silt, sediment and additional debris from the runoff water flows passing through the flow control openings so that substantially cleaned water flows are enabled to flow through and be drained via the storm water drainage system.

Various objects, features and advantages of the present invention will become apparent to those skilled in the art upon a review of the following detailed description, when taken in conjunction with the accompanying drawings.

DETAILED DESCRIPTION OF THE INVENTION

Figure 1:
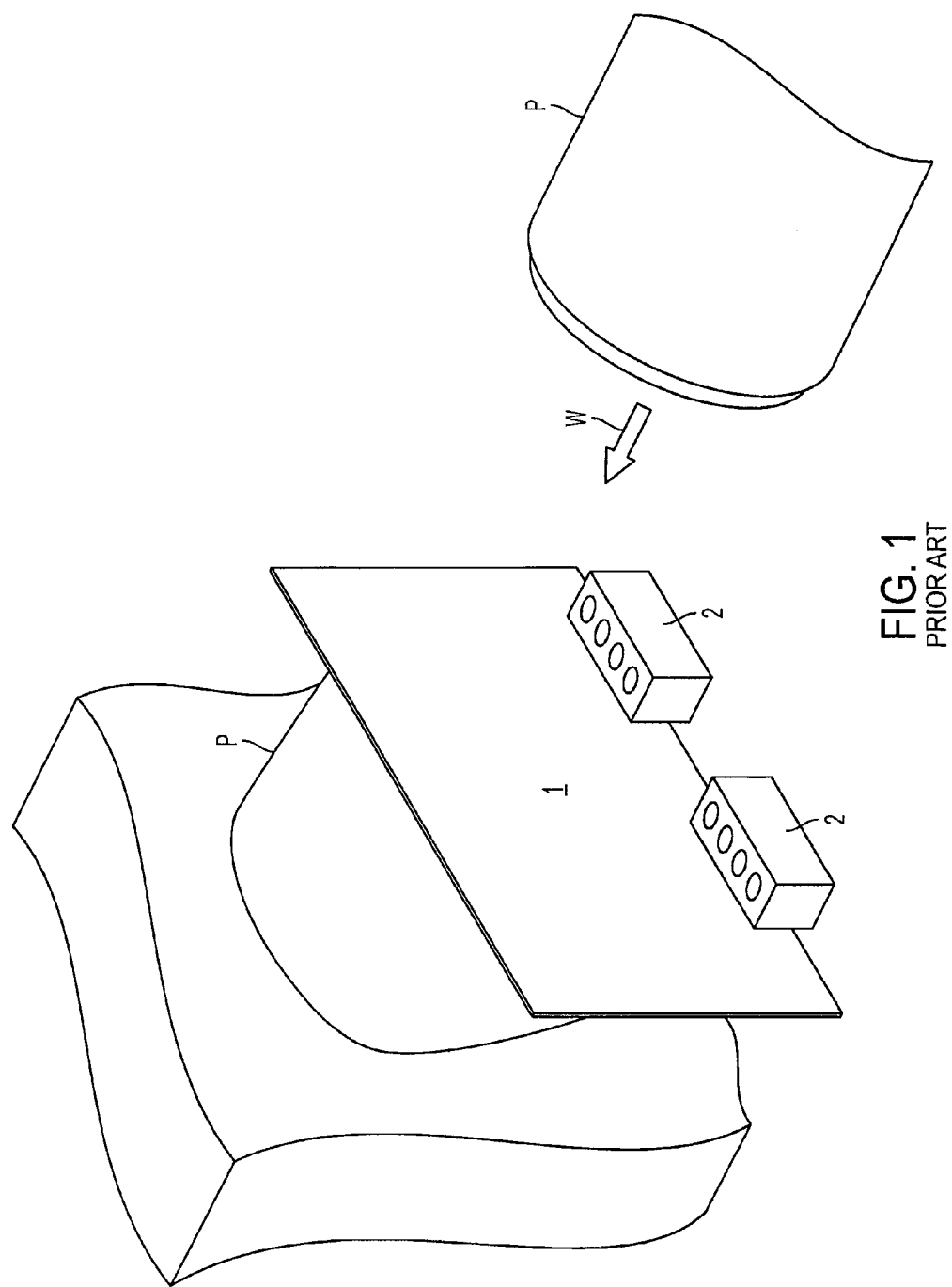
FIG. 1 is a perspective illustration of a prior art system for temporarily enclosing an open storm water pipe.

In general, the present invention relates to devices and systems for the prevention of sediment and debris from entering and collecting in horizontal storm water pipes, and in particular, to a drainage member or system adapted to be temporarily mountable over or within an open end of a pipe receiving storm water, prior to the installation of the vertical inlet structure. Referring now to the drawings in which like numerals indicate like parts throughout the several views, FIGS. 2-4 generally illustrate a temporary storm water drainage control member 10 adapted to be releasably mountable on a storm water pipe P (FIG. 4) or similar piping, for a storm water drainage system S. The drainage control member 10 is adapted to temporarily seal or cover the open end O of the storm water pipe P during construction and/or repair of the storm water drainage system S for filing water flows W passing into the open end of the storm water pipe. The temporary drainage control member of device can fit within or over the receiving end of a horizontal storm water pipe so as to trap and substantially prevent sediment and other debris from being washed or otherwise deposited within the pipe during construction of the storm water drainage system while still enabling water to drain into the pipe through the drainage control member. The drainage control member thus helps substantially remove and/or filter out dirt and debris, including fine sediment or silt, from such water flows passing into the open end of the storm water pipe during construction and/or repair, while still enabling the runoff water flows to drain into and through the storm water drainage system to facilitate drainage of such runoff water from a surrounding site or area. As construction and/or repair of the storm water drainage system is continued to completion, the temporary drainage control member 10 can be removed and reused with additional storm water pipes as needed.

Figure 2:
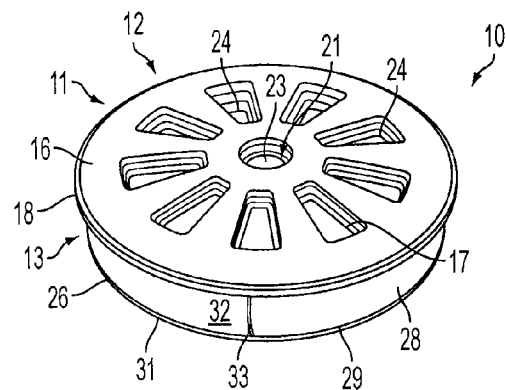
FIG. 2 is a perspective view of one example embodiment of a temporary storm water drainage control member according to the principles of the present invention.
Figure 3B:
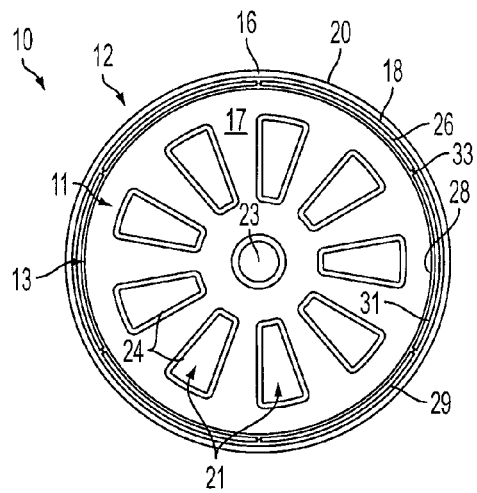
FIG. 3B is a bottom view of the temporary storm water drainage control member of FIGS. 2 and 3A.

As illustrated in FIGS. 2-3B, the drainage control member 10 generally includes a control member body 11, here shown as having a substantially circular shape or configuration. The shape or configuration of the control member body 11 generally corresponds to or substantially matches the configuration of conventional storm water pipes, and it will be understood that while a substantially circular construction is illustrated in the present embodiments, additional configurations, such as square, rectangular and/or other shapes also can be used depending upon the shape or configuration of the storm water pipes with which the drainage control member will be used.

Figure 3A:
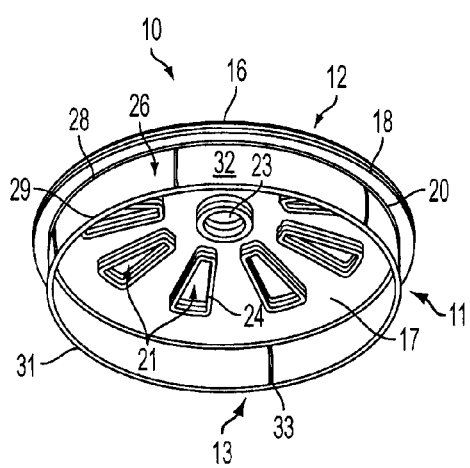
FIG. 3A is perspective view of the underside of the temporary storm water drainage control member of FIG. 2.

The body 11 of the drainage control member 10 further will typically be made from a durable, substantially resilient material, including various plastic or synthetic materials such as a polyvinyl chloride (PVC), polyoxymethylene plastics (commonly known as Delrin®), acetyl resin materials and other, similar materials generally having sufficient durability and strength so as to resist collapse, breaking and/or degradation as water, dirt and other environmental elements act thereon. The drainage control member body further can be made from other resilient, durable and high-strength materials such as various metal materials, including aluminum, or other natural materials as needed. As indicated in FIGS. 2 and 3A, the drainage control member body can be formed as a substantially unitary structure, such as by molding or extruding the body in a desired configuration, and will include a first, upper or distal portion 12 and a second, lower or proximal portion 13. The proximal and distal portions 12 and 13 alternatively also can be formed as separate sections or elements that then can be attached together, such as by adhesives, welding, bonding, fasteners, or other means as will be understood by those skilled in the art.

Figure 4:
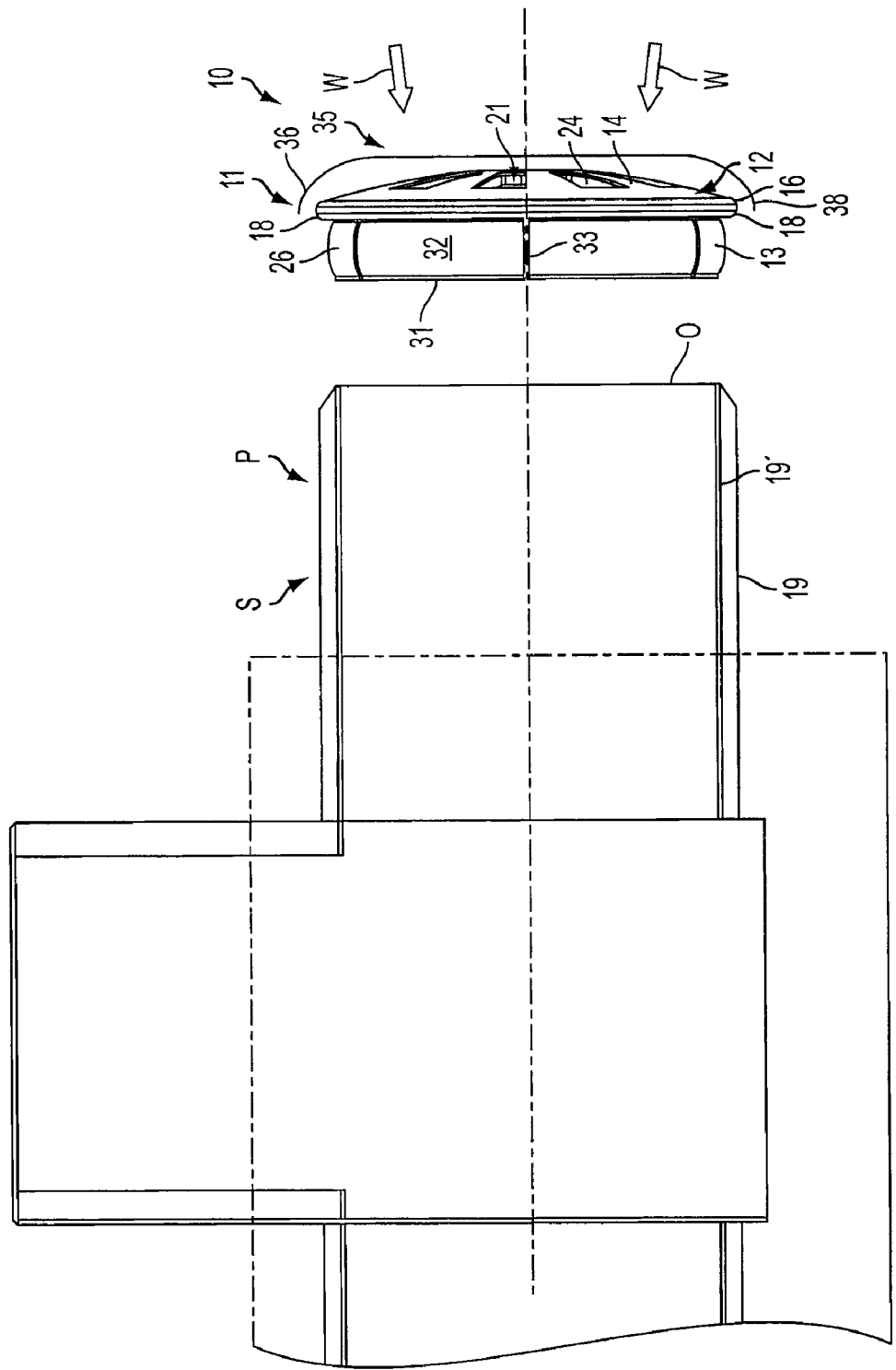
FIG. 4 is a side elevational view schematically illustrating the mounting of a temporary storm water drainage control member according to the principles of the present invention on a storm water pipe.

As indicated in FIGS. 3A-4, the first or distal portion 12 of the drainage control member body 11 generally will include an upper surface 14 surrounded by a rim 16, which rim can at least partially overlap the proximal portion 13 of the drainage control member body 11, and a lower surface 17. The distal portion 12 also can be substantially flat, or formed with an arcuate shape as indicated in FIGS. 2 and 4. As further indicated in FIGS. 3A and 3B, the rim 16 of the distal portion 12 also can be formed with a curved or inwardly biased edge 18 for engaging an outer side wall 19 of the storm water pipe P as needed, and/or can include a sealing material such as a compressible gasket or sealing ring, indicated at 20 in FIG. 3B. A series of flow control openings 21 additionally are formed through the distal portion 12 of the drainage control member body 11 to facilitate the flow of water therethrough as shown in FIGS. 2-3B.

Figure 5:
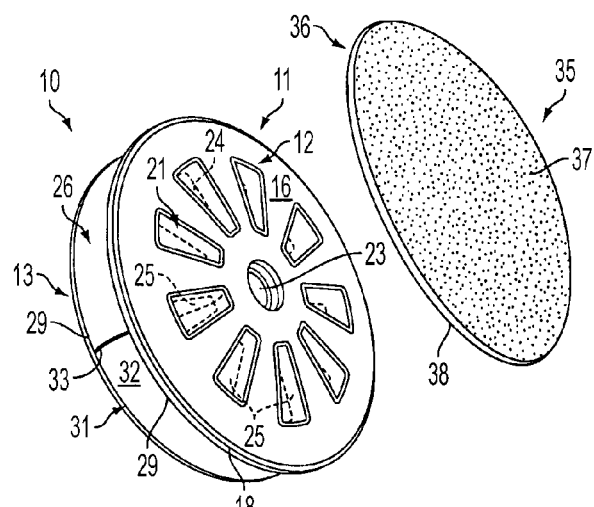
FIG. 5 is a perspective view of an additional embodiment of the temporary storm water drainage control member, illustrating the application of a filtering material thereto.

The flow control openings 21 can vary in size and number, for example, 2-4 openings (FIG. 5) up to 10 or more flow control openings 21 (FIGS. 2-3B) can be used, and the openings can be formed/arranged in a variety of configurations depending upon the expected use and/or expected water flows to which the drainage control member will be exposed. For example, in FIGS. 2 and 3B, a center flow control opening 23, having a substantially circular configuration, is shown surrounded by nine spaced peripheral openings 24, each having a substantially trapezoidal or triangular configuration. Alternatively, as shown in FIG. 5, the center opening 23 is shown as being surrounded by approximately four spaced peripheral openings 24, though other configurations and/or sizes of openings also can be used. Still further, it will be understood by those skilled in the art that while the flow control openings 21 can be formed in varying sizes, it additionally could be possible to provide moveable plates, covers or guards 25 adjacent one or more of the flow control openings, which are moveable thereacross so as to vary the size of the openings as needed on site.

As illustrated in FIGS. 2, 3A and 4, the second or proximal portion 13 of the drainage control member body 11 generally defines a side wall 26 projecting from the lower or bottom surface 17 of the distal portion 12, which side wall 26 further typically has a diameter or size slightly less than the diameter or size of the rim 16 of the distal portion 12. The side wall 26 generally includes a first end 28 adjacent the lower surface 17 of the distal portion 12 and a second end 29 spaced therefrom and defining a rim 31 thereabout. An intermediate portion 32 is defined between the first and second ends 28 and 29 of the side wall 26, and typically has a bowed or outwardly expanded configuration, as indicated in FIGS. 2 and 4. Additionally, a series of expansion features 33 can be formed in the intermediate portion of the side wall at spaced intervals about the circumference of the side wall 26. Such expansion features can include expandable weakened or flexible areas such as cuts, score lines, gussets or other, similar features that provide further flexibility and/or resilience to the side wall of the proximal portion 13 to assist in providing a frictional engagement or fit between the side wall of the proximal portion and the inner 19' or outer 19 side walls of the storm water pipe P for temporarily or releasably mounting the drainage control member 10 thereto, as indicated in FIG. 4.

As additionally indicated in FIGS. 4 and 5, a filtering material 35 generally will be applied over the upper surface 16 of the distal portion 12, at least partially covering the flow control openings 21, and generally substantially covering all the flow control openings. The filtering material 35 can include a porous filtering material, such as a polyester, polyoelephin or polypropylene material, or a conventional silt screen or mesh material of the type known to those skilled in the art including various plastic, nylon or wire mesh filtering materials having a desired porosity or opening sizes therein. For example, the filtering material can include a conventional silt retention fabric material and having a series of openings or pores within a range of, for example, approximately 0.1 millimeter up to 5 millimeters, although greater or lesser pore opening sizes also can be used as needed or desired. The filtering material 35 can be applied as one or more sheets of filter material, in a stacked or overlapping configuration, or as a single sheet applied over the upper surface 14 of the distal portion 12. The side edges 36 of the filtering material 35 further can be secured about the rim 16 of the distal portion by hooks, fasteners, adhesive materials or other attachment means, or additionally could be extended or wrapped about the rim 16 of the distal portion 12 and/or the rim 31 of the side wall 26 of the proximal portion 13 so as to be held in place by frictional engagement between the side wall 26 and inner or outer side wall of the storm water pipe.

Alternatively, as indicated in FIG. 5, the filtering material 35 can be formed as a filter cover 37 having a configuration substantially corresponding to a configuration of the distal portion 12 of the drainage control member body and further including a circumferential side edge 38, which can include an elastic material so as to cause the side edge 38 to contract and/or fit about the upper end of the side edge of the proximal portion, when the filter cover is applied over the distal portion of the drainage control member body for ease of attachment thereto. The side edge 38 of the cover 37 further can include integral fasteners, such as adhesive strips, hooks, etc. adapted to help secure the cover in place over the distal portion of the drainage control member body.

In use, as indicated in FIG. 4, the drainage control member 10 generally can be applied over the open end O of a storm water pipe P. The drainage control member, as indicated, can be applied over the opening of the storm water pipe without the required use of additional fasteners, bracing materials, stakes, etc., but rather will generally engage an inner or outer side wall 19'/19 of the storm water pipe in a frictional engagement for temporarily mounting the drainage control member 10 thereto. For example, in one embodiment, as indicated in FIG. 4, the drainage control member can be mounted such that the side wall 26 of the proximal portion 13 slides into and engages the inner side wall 19' of the storm water pipe. The bowed or expanded configuration of the intermediate portion 32 of the side wall 26 typically engages and bears against the inner side wall of the storm water pipe to hold the drainage control member in place by frictional engagement with the inner side wall of the storm water pipe. Additionally, the rim formed about the upper surface of the distal portion of the drainage control member can engage the outer side wall 19 of the storm water pipe so as to substantially seal against the outer side wall to prevent passage of dirt and debris therearound. Still further, the rim of the distal portion also can be provided with a sealing material, such as a gasket or other flexible material, to help provide a substantially dirt and water resistant seal between the rim of the distal portion and the outer side wall of the sewer inlet, and to further assist in mounting and maintaining the drainage control member over the open end of the storm water pipe without the requirement for additional fasteners, stakes or other bracing materials.

Alternatively, the drainage control member 10 can be temporarily and/or releasably mounted over the open end of the storm water pipe by fitting of the proximal portion 13 onto/about the open end of the storm water pipe so that the rim 31 of the side wall 26 thereof engages and bears against the outer side wall 19 of the storm water pipe P (FIG. 4). In such a configuration, the resilience of the material of the side wall and the outwardly expanded or bowed configuration of the intermediate portion 32 helps urge and maintain the rim 31 of the side wall inwardly toward and against the outer side wall of the storm water pipe to help maintain frictional contact therewith. The expansion features 33 additionally can help expand the rim of the side wall as needed to fit over the slot along the outer side wall of the storm water pipe and help add elasticity to the rim when mounted on the outer side wall to help resist movement or detachment of the drainage control member therefrom.

During the mounting process, or after the mounting, filtering material 35 can be applied over the upper surface of the distal portion of the drainage control member, at least partially covering the flow control openings therein. As runoff water flows are directed or flow against the drainage control member, silt, sediment, dirt and debris are substantially filtered from the water flows and prevented from entering the open end of the storm water pipe, while the runoff water flows are substantially cleaned and allowed to pass therein. As construction and/or repairs are continued, and additional storm water pipes are to be mounted in series to continue formation of the storm water drainage system, the drainage control member 10 can be removed from its engagement over the open end of a current storm water pipe, with its filtering material being stripped therefrom and disposed of or cleaned, and once the additional storm water pipes are placed in line, the drainage control member 10 can be reused with a further upstream storm water pipe. The drainage control member thus can be reused at multiple additional job sites, which helps avoid or cut down material waste and provides a simple, reusable solution to filtering of dirt and debris from runoff water flows during the construction of storm water drainage systems.

It will be understood by those skilled in the art that while the present invention has been discussed above with respect to particular embodiments, various additions, changes and modifications can be made thereto without departing from the spirit and scope of the invention as set forth in the following claims.

What is claimed is:

1. A system for temporarily controlling and filtering silt from a water flow into a drainage system prior to construction of a catch basin or storm drain inlet thereof, comprising:
    a horizontal storm water pipe connected to the drainage system during construction;
    a storm water pipe sediment control member releasably mountable over an open end of the horizontal storm water pipe and comprising a control member body formed from a resilient material and having a distal portion and a proximal portion projecting therefrom, the proximal portion adapted to engage a side wall of the storm water pipe in a frictional fit therewith so as to temporarily secure said drainage control member over the open end of the horizontal storm water pipe, while enabling removal and reuse of the drainage control member with successive storm water pipes during construction;
    wherein said distal portion includes a series of flow control openings formed therethrough to enable passage of water; and
    a filter material applied against said distal portion, at least partially covering said flow control openings for filtering silt from the water flow draining into the horizontal storm water pipe.

2. The system of claim 1 and wherein said proximal portion comprises a side wall configured and dimensioned so as to engage and fit about an outer side wall of the horizontal storm water pipe.

3. The system of claim 2 and wherein said side wall of said proximal portion comprises a first end adjacent said distal portion, a second end spaced therefrom and defining a substantially circular rim, and an intermediate portion having an expanded circumference so as to bias said rim inwardly toward the outer side wall of the horizontal storm water pipe.

4. The system of claim 1 and wherein said flow control openings comprise variably sized openings.

5. The system of claim 1 and wherein said side wall of said proximal portion comprises a bowed configuration adapted to engage an inner side wall of the horizontal storm water pipe in frictional engagement.

6. The system of claim 5 and wherein said distal portion of said body comprises a rim formed thereabout and adapted to fit about and at least partially overlap the open end of the horizontal storm water pipe.

7. A system for temporarily controlling and filtering silt from a water flow into a drainage system prior to construction of a catch basin or storm drain inlet thereof, comprising:
    a horizontal storm water pipe connected to the drainage system during construction;
    a storm water pipe sediment control member releasably mountable over an open end of the storm water pipe and comprising a control member body formed from a resilient material and having a distal portion and a proximal portion projecting therefrom, which proximal portion is adapted to engage a side wall of the storm water pipe in a friction fit therewith so as to temporarily secure said drainage control member over the open end of the storm water pipe without fasteners; wherein said proximal portion of said body comprises a series of expansion features formed in said side wall at spaced intervals to help facilitate the frictional fit mounting of said drainage control member within the storm water pipe;

wherein said distal portion includes a series of flow control openings formed therethrough to enable passage of water; and a filter material applied against said distal portion, at least partially covering said flow control openings for filtering silt from the water flow draining into the storm water pipe.

8. The system of claim 1 and wherein said filter material comprises a silt retention fabric having an apparent sieve opening size of at least 0.3 mm.

9. The system of claim 1 and wherein said silt retention sheet is sized and configured so as to substantially completely cover said flow control openings and is adapted to be releasably secured to said drainage control member with fasteners.

10. The system of claim 1, and further comprising at least one moveable plate adjacent at least one of said flow control openings and moveable thereacross so as to vary a size of said at least one of said flow control openings.

11. A method of protecting storm water pipes from ingress of silt and debris during construction of a storm water drainage system while enabling passage of water into the storm water drainage system, comprising:

placing a temporary storm water sediment control device comprising a body having a distal portion and a proximal portion projecting therefrom over an open end of a storm water pipe;

securing the temporary storm water sediment control device in a position covering the open end of the storm water pipe by contacting and engaging the side wall of the storm water pipe with the proximal portion of the temporary storm water sediment control device body in a frictional fit without fasteners to temporarily secure the temporary storm water sediment control device to the storm water pipe covering the open end thereof;

as construction of the storm water drainage system is continued, removing the body of the temporary storm water sediment control device from the open end of the storm water pipe;

mounting at least one additional storm water pipe in-line with the storm water pipe; and securing the temporary storm water sediment control device in a position covering the open end of the additional storm water pipe by contacting and engaging the side wall of the storm water pipe with the proximal portion of the temporary storm water sediment control device body in a frictional fit without fasteners to temporarily secure the temporary storm water sediment control device to the additional storm water pipe covering the open end thereof.

12. The method of claim 11, further comprising mounting a filtering material over the distal portion of the body of the temporary storm water sediment control device.

13. The method of claim 11, further comprising repeating the steps of removing the temporary storm water sediment control device from the additional storm water pipe, mounting successive additional storm water pipes in-line as the construction of the storm water drainage system continues, and securing the temporary storm water sediment control device in a position covering the open end of the additional storm water pipe, until completion of the storm water drainage system.

14. The method of claim 11, further comprising moving at least one plate across at least one flow opening formed in the distal portion of the body of the temporary storm water sediment control device to vary a flow size of the at least one flow opening.

15. The method of claim 11, wherein securing the temporary storm water sediment control device in a position covering the open end of the storm water pipe comprises placing a side wall of the proximal portion of the body of the temporary storm water sediment control device in frictional engagement with an outer side wall of the storm water pipe.

16. The method of claim 11, wherein securing the temporary storm water sediment control device in a position covering the open end of the storm water pipe comprises placing a side wall of the proximal portion of the body of the temporary storm water sediment control device in frictional engagement with an inner side wall of the storm water pipe.

* * * * *